United States Patent [19]

Rice et al.

[11] 4,246,466

[45] Jan. 20, 1981

[54] ELECTRIC HEAT STORAGE APPARATUS

[75] Inventors: Richard E. Rice, Arlington; Barry M. Cohen, Newton; George W. Webb, Revere, all of Mass.

[73] Assignee: Hooker Chemicals & Plastics Corporation, Niagara Falls, N.Y.

[21] Appl. No.: 67,997

[22] Filed: Aug. 20, 1979

Related U.S. Application Data

[63] Continuation-in-part of Ser. No. 871,729, Jan. 23, 1978, abandoned.

[51] Int. Cl.³ .......................... H05B 1/02; F24H 7/02
[52] U.S. Cl. .................................... 219/325; 126/400; 165/104 M; 165/104 S; 219/315; 219/316; 219/321; 219/378; 219/486; 219/530
[58] Field of Search ................ 219/328, 364, 365, 341, 219/325, 326, 320, 321, 315, 316, 530, 540, 492, 486, 487; 126/400; 165/104 R, 104 S, 104 M, 18

[56] References Cited

U.S. PATENT DOCUMENTS

| | | | |
|---|---|---|---|
| 1,916,861 | 7/1933 | Hynes et al. | 219/315 X |
| 2,178,049 | 10/1939 | Mouton et al. | 219/378 X |
| 2,536,747 | 1/1951 | Hynes | 219/315 |
| 3,356,834 | 12/1967 | Mekjean | 219/530 |
| 3,439,151 | 4/1969 | Mekjean | 219/530 |
| 3,453,416 | 7/1969 | Mekjean | 219/530 |
| 3,475,596 | 10/1969 | Lawrence et al. | 219/530 |
| 3,492,461 | 1/1970 | Lawrence | 219/378 X |
| 3,558,856 | 1/1971 | Lawrence et al. | 219/492 |
| 3,569,669 | 3/1971 | March | 219/378 |
| 3,689,738 | 9/1972 | Laing | 219/378 |

FOREIGN PATENT DOCUMENTS

| | | | |
|---|---|---|---|
| 2424941 | 1/1975 | Fed. Rep. of Germany | 219/315 |
| 570441 | 7/1945 | United Kingdom | 219/320 |

*Primary Examiner*—A. Bartis
*Attorney, Agent, or Firm*—James H. Grover

[57] ABSTRACT

An apparatus for storing electrically generated heat includes a sealed container holding a bed of fusible heat storage medium, such as an alkali metal hydroxide composition, and having an expansion space above the bed of material to accommodate the medium in its liquid phase. A generally horizontal main electric heating unit is located in the bottom portion of the container for heating the fusible medium above its melting point. A first vertical electric heater is provided in the bed of material in thermal contact with the main heating unit and has its active heating portion extends upwardly from the main heating unit only to the height of the heat storage medium in solid phase. A second vertical electric heater is located in the container in thermal contact with the first vertical heater with the active heating portion of the second heater extending only from the height of the fusible medium in solid phase to the height of the medium in the expanded liquid phase. The main heating unit and first vertical heater are controlled by a control means responsive to the temperature in the vicinity of the main heating unit. The second vertical heater is independently controlled by a control responsive to the temperature in the upper part of the container. The main heating unit and vertical heaters each contain removable electric heating elements which can be repaired or replaced without drawing the heat storage medium from the container.

8 Claims, 3 Drawing Figures

4,246,466

ELECTRIC HEAT STORAGE APPARATUS

This application is a continuation-in-part of our application Ser. No. 871,729 entitled IMPROVED APPARATUS FOR STORING HEAT filed Jan. 23, 1978, now abandoned.

BACKGROUND OF THE INVENTION

The present invention relates to an apparatus useful to store heat. The heat storage medium utilized in the present apparatus is fusible, that is, it undergoes a solid-liquid phase change during its charging and discharging cycles. During such cycles, the density of the medium decreases (i.e., the volume increases) as the medium melts. To accommodate this volume change, a clearance space is provided which normally contains gas— for example, air. The present invention provides an improved means for alleviating high pressures which may be produced within the heat storage container when the heat storage medium is converted from the solid state to the liquid state. The present invention also provides an improved arrangement of heating units whereby the heating elements may be replaced without draining the heat storage medium from the heat storage container.

When uniform heat is applied to a solid material held in a container, the uniform heat throughout the solid results in the even liquefaction of the solid. The formed liquid can expand into the clearance space, and no adverse internal pressures are built up within the container. However, it is impractical to apply a uniform heat to all parts of a tank of solid heat storage material. In actual practice, localized heaters are utilized, and the problem of internal pressures within the container is encountered and must be reckoned with.

In operation, when the localized heaters are utilized to melt a solid heat storage medium, which may occur either on initial start-up or during any cycle in which the heat storage medium has been allowed to solidify, a large amount of heat is supplied to the heat storage medium at relatively localized points. Such localized heating melts the solid material in pools contained within the otherwise solid material. As the solid melts, the expansion of the liquid phase produces high internal pressures which are capable of distorting or rupturing the container.

Presently, heat storage units are fabricated by positioning one or more main heating units within the heat storage container. These units are usually located in the bottom portion of the container. A vertical heater may be utilized to provide a pressure escape path to the clearance space for the expanding liquid medium. The use of only vertical heaters is not feasible because the heated liquid medium circulates very readily and rapidly rises to the top. Thus, the maximum temperature allowable in the system would be reached at the top while the temperature at the bottom would be considerably lower, and the full heat storage capacity of the medium could not be utilized. The prior art proposes an escape channel by providing a vertical heater which may be a length of metal thermally connected to and heated by one or more of the lower main heaters, or by a vertical section of a main heater which extends to the clearance space. The length of metal or the vertical section of heater extend through the level of the heat storage medium when liquid. The vertical heater section is the more reliable means of providing an escape path, as the heat conductivity of the length of metal may not be sufficient to provide an escape path before high pressure is built up from the lower heater source. However, the vertical heater section, being activated when the unit is discharged, has a substantial amount of surface area exposed to the gas in the clearance space until the level of the melting heat storage medium rises to its highest level. Since heat dissipation from the heater surface to the liquid medium is much more effective than to a gaseous ambient, this can result in serious overheating of the heating element exposed to the gas and in premature failure of the element and rapid corrosion of the heater surfaces exposed to the gas.

A preferred type of heater consists of an electrical heating element, such as Nichrome wire, inside of a metallic tube which is immersed in the heat storage medium. The tube protects the element from corrosion by the medium, and from electrical short-circuiting by the medium, many of which are electrically conducting when in the molten state.

In actual practice, the heaters are arranged within the container, molten heat storage medium is introduced into the container, allowed to solidify, and the unit transported to an installation site. The embedded heaters are then utilized to melt, or charge, the heat storage medium and impart heat into the system. Main heating units of the prior art have commonly been of the type in which the heating element, an electrical insulating material, and a metallic outer sheath, are constructed as an inseparable unit, and are immersed in the heat storage medium. Such designs do not lend themselves to in situ repair or replacement of heating elements. Typical prior art heater arrangements are found in U.S. Pat. Nos. 3,356,834; 3,439,151; 3,453,416; 3,475,596; 3,492,461; and 3,558,856.

Preferred heat storage mediums are alkali metal hydroxide compositions. Such compositions are preferred because of their relatively high storage capacities, high heats of fusion, broad operative ranges, relative inertness, and their low vapor pressures. Alkali metal hydroxides have melting points ranging from about 272° C. for cesium to about 450° C. for lithium. The incorporation of additives such as corrosion inhibitors and non-reducing agents into the alkali metal hydroxide heat storage compositions facilitates the production of useful mixtures with a variety of melting points.

Sodium hydroxide compositions are commonly available and are aptly suited for use as the heat storage medium of the present invention. Relatively pure sodium hydroxide has a melting point of about 318° C. However, compositions including other salts may consist of liquid-solid mixtures in the range from about 232° C. to about 340° C. During a heat storage cycle, sodium hydroxide may be heated to temperatures as high as 675° C. without harm. Normal operating temperatures of heat storage units containing sodium hydroxide compositions as a heat storage medium range from about 100° C. to about 500° C.

The previously proposed heat storage devices present a problem when the immersed heating elements fail. In order to repair or replace the defective element, the heat storage medium must be melted and drained, the element repaired and replaced, and the heat storage medium returned to the container. Such maintenance and repair operations are very costly. As a practical matter, the units requiring repair are usually taken out of service and returned to the manufacturer, entailing the substantial expense of disconnecting, shipping, and subsequently reconnecting of the unit. There is also the added inconvenience of lack of service if a spare unit is not readily available.

The present invention describes an improved vertical heater arrangement which provides an escape channel for the liquid heat storage material within the solid heat storage medium, thereby avoiding the development of internal pressures within the unit due to non-uniform heating, and avoiding deleterious overheating of the heater elements or the protective sheaths of the heaters.

The present invention also provides a heat storage apparatus which facilitates the repair or replacement of heating elements at the use-site, preferably without interruption of the heat storing operation.

SUMMARY OF THE INVENTION

According to the present invention apparatus for storing heat comprises a container having a bed of fusible heat storage medium therein; a main heating unit located in the bottom portion of said container for heating said bed of fusible medium above its melting point; a first vertical heater located in said bed of fusible heat storage material and in thermal contact with the main heating unit, the active portion of said first vertical heater extending upwardly from said main heating unit substantially only to the height of the heat storage medium in solid phase, and a second vertical heater located in said container and in thermal contact with said first vertical heater, the active portion of said second heater extending substantially only from the height of said heat storage medium in solid phase to the height of said heat storage medium in liquid phase, said first and second vertical heaters being independently energizable.

DESCRIPTION OF THE INVENTION

The present invention can best be understood by reference to the accompanying drawings which are part hereof and are hereby incorporated herein.

Figure 1:
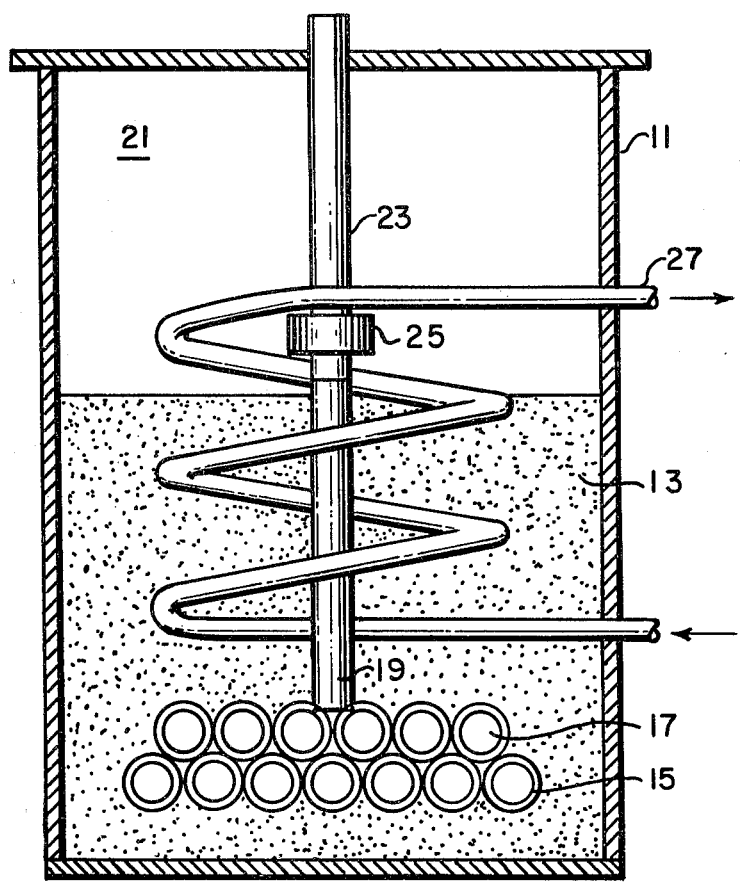
FIG. 1 is a diagrammatic view of a discharged tank of alkali metal hydroxide composition containing a main heater assembly and an improved dual, independent, vertical heater assembly of the present invention.

Looking now at FIG. 1, heat storage container, or tank 11, suitably of a metal such as steel, contains heat storage medium 13. Medium 13 operates on the heat of fusion principle. Suitably, the medium is an alkali metal hydroxide composition. Eminently suited is a commercially available heat storage medium marketed under the trademark Thermkeep. Thermkeep composition is an alkali metal hydroxide, alkali metal nitrate mixture which may contain corrosion inhibitors. As shown in FIG. 1, the heat storage unit is completely discharged, that is, the bed of heat storage medium 13 in tank 11 is in a solid state at its lowest operating temperature. Positioned in the bottom portion of tank 11 is a main heating source comprised of a plurality of horizontal heating tubes 17 which may suitably be equipped with metal flanges 15 or a thermal connecting link to facilitate good thermal connection between the tubes at one or more locations. A first vertical heater 19 is positioned within tank 11 in thermal contact with at least one horizontal heating tube 17 and extends upward into expansion space 21. A second vertical heater 23 is thermally connected to the first vertical heater 19 by means of thermal link 25. A conduit 27 facilitates the passage of a heat transfer medium, or fluid to be heated, for example, water, through heat storage medium 13. Heat from medium 13 is thereby discharged from the unit.

Figure 2:
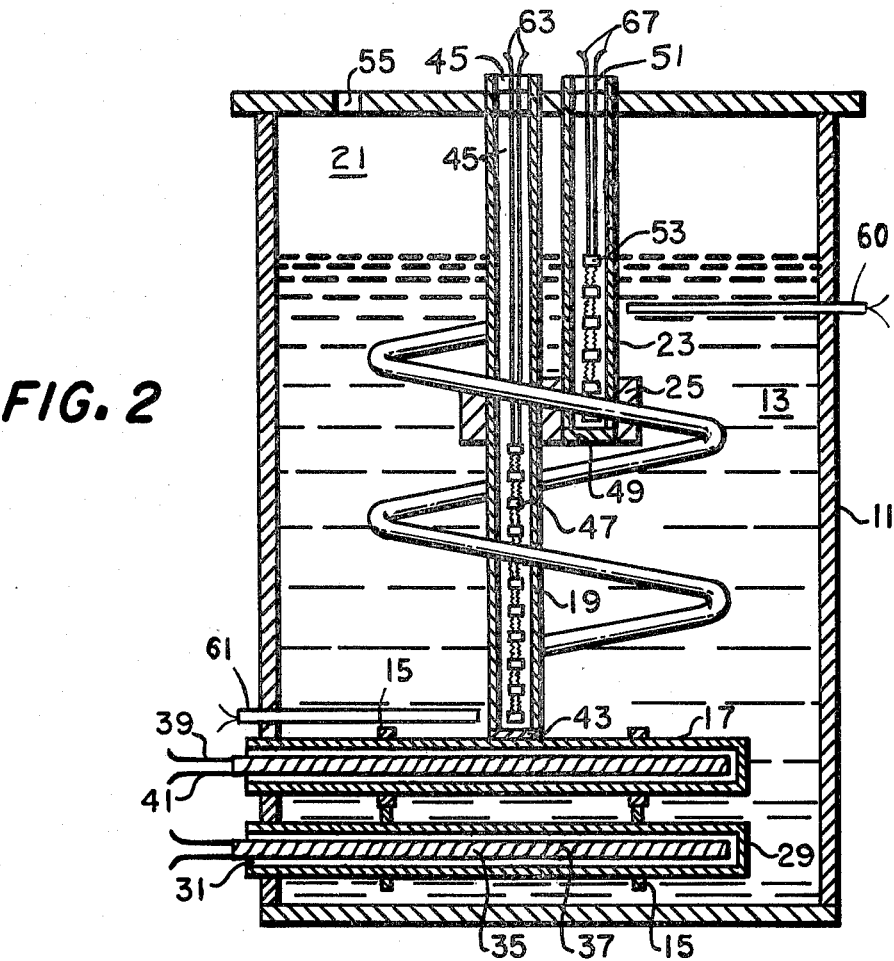
FIG. 2 is a diagrammatic side view of the tank of FIG. 1 in a full charged condition.

FIG. 2 is a side view of the heat storage unit of FIG. 1, showing the horizontal heater tubes and vertical heaters in section. As shown in FIG. 2, the unit is completely charged, that is, the bed of heat storage medium 13 is liquid at the maximum temperature of the operating cycle. The main heating source is comprised of a plurality of horizontal heating tubes 17. Horizontal heating tubes 17 are suitably fabricated of steel and have a closed end 29 extending toward, but spaced from the internal wall of tank 11 to provide space for expansion within the tank without placing stress on the tank walls. Horizontal heating tubes 17 have an open end 31 extending through the side wall of tank 11. Tubes 17 contain electrical heating elements, which may suitably consist of quartz tubes 35 containing resistance elements 37. Electrical leads 39 and 41 extend to the outside of tank 11 and are appropriately connected to a source of electrical current. It will be appreciated that, in case of failure or malfunction of a heating element, the element may be removed and replaced in horizontal heating tubes 17 without draining tank 11 and without serious disruption of the heating function of the unit. First vertical heater 19 is comprised of a hollow tube having a closed bottom end 43 and open end 45 extending through the top of tank 11. First vertical heater 19 is suitably fabricated of steel and is positioned in thermal contact with at least one horizontal heating tube 17. First vertical heater 19 contains heating element 47 which extends from the closed bottom of heater 19 to a level adjacent to the height of heat storage medium 13 when the unit is discharged, as shown in FIG. 1. First vertical heater 19 supplies heat only to the height of the solid heat storage medium. Therefore, the portion of the protection tube which is exposed to the gas in clearance space 21 is not excessively heated. First vertical heater 19 is thermally connected to second vertical heater 23 by metal link 25. Second vertical heater 23 is comprised of a hollow tube having a closed bottom end 49 and an open upper end 51 outside of tank 11. Second vertical heater 23 houses a heating element 53 which extends from the closed bottom end 49 of second vertical heater 23 to a level adjacent to the level of the heat storage medium when the unit is completely charged, as it is shown in FIG. 2. The tube 23 is preferably constructed of an alloy such as Inconel or Monel which is resistant to corrosion and oxidation when the tube is exposed to the gas in clearance space 21 and when heating element 53 is energized. Electrical leads 63 and 67 to heating elements 47 and 53 extend outside tank 11 and are appropriately connected to a source of electrical current. It will be appreciated that, in case of failure of elements 47 and 53, repair or replacement may be carried out without draining tank 11 or seriously interrupting the heating function of the unit. Preferably elements 47 and 53 are of an open coil design and would require minimal clearance about the unit for removal and replacement. Alternatively, rigid elements 35 may be used. Tank 11 may be equipped with vent 55 to allow air to enter and leave the expansion space 21 during thermal cycling. Alternatively, the clearance space 21 may be sealed, as described in U.S. Pat. No. 3,501,261.

In operation starting from a condition of minimum thermal charge as the unit is shown in FIG. 1, vertical heaters 19 and 23 are initially activated. Second vertical heater 23 is suitably controlled by a temperature sensor, 60, such as a thermocouple positioned in the upper portion of the unit, to remain energized until the temperature of the medium exceeds its melting temperature. Horizontal heating tubes 17 may be activated simultaneously with heaters 19 and 23, or a few minutes thereafter to insure that an escape path has been established for the liquid heat storage medium. When the melting temperature has been exceeded in the vicinity of vertical heater 23, it is deenergized. Vertical heater 19 and horizontal heating tubes 17 remain energized until sensor 61 indicates that the maximum desired temperature of the medium is reached in the vicinity of heating tubes 17. Thereafter vertical heater 19 and horizontal heating tubes 17 are energized and de-energized simultaneously as required, and vertical heater 23 is energized when the temperature of the surrounding medium approaches the solidifying temperature range.

A preferred medium comprises 5% to 30% by weight of $NaNO_3$, 0.1% to 0.5% $MnO_2$, and the balance commercial grade anhydrous NaOH (which may contain small amounts of NaCl and $Na_2CO_3$). When using this medium, the melting (and solidifying) range is approximately 250° C. to 320° C., and the maximum operating temperature of the medium may be approximately 455° C.

Figure 3:
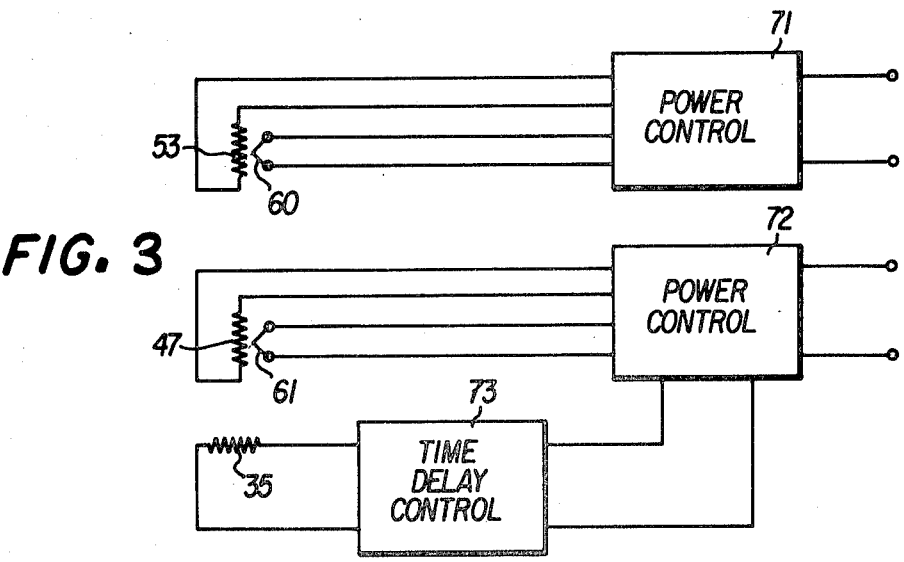
FIG. 3 is a schematic diagram of the elements used to energize and de-energize the heaters.

The operation of the system may be controlled by the elements shown in FIG. 3, in which a thermocouple temperature sensor 60 actuates power controller 71 which energizes and de-energizes heater 53 as described above. A second thermocouple temperature sensor 61 actuates power controller 72, which energizes and de-energizes simultaneously vertical heater 47 and main heater 35 as described above.

It will be appreciated that exposure to the gas in clearance space 21 of the first and second vertical heaters while energized is minimized. First vertical heater 19 is not exposed, and exposure of the second vertical heater 23 is minimal. Second vertical heater 23 may suitably be fabricated of corrosion resistant metal such as nickel, Iconel, or Monel to protect the heater from surface deterioration.

The invention described herein is applicable to phase change heat storing media in general. Such media include, among others, alkali and alkaline earth carbonates, chlorides, bromides, iodides, fluorides, hydroxides, nitrates, and nitrites; fusible metals; and fusible organic materials. The metals which are suitable include those which are suitably compatible with the heat storage media. Heaters may be energized by heat transfer fluids as well as by electric heating elements.

The present invention has been described and illustrated in the above specification and examples with reference to several specific embodiments. Such reference has been made for purely illustrative purposes, and various modifications in the details therein included can be made without departing from the scope and spirit of the invention as will be obvious to those of ordinary skill in this art.

We claim:
1. An apparatus for storing heat comprising:
   a container having a bed of fusible heat storage medium therein;
   a main heating unit located in the bottom portion of said container for heating said bed of fusible medium above its melting point;
   a first vertical heater located in said bed of fusible heat storage material and in thermal contact with the main heating unit, the active portion of said first vertical heater extending upwardly from said main heating unit substantially only to the height of the heat storage medium in solid phase, and
   a second vertical heater located in said container and in thermal contact with said first vertical heater, the active portion of said second heater extending substantially only from the height of said heat storage medium in solid phase to the height of said heat storage medium in liquid phase, said first and second vertical heaters being independently energizable.

2. The apparatus of claim 1 wherein the heat storage medium is an alkali metal hydroxide composition.

3. The apparatus of claim 2 wherein the alkali metal hydroxide composition is a sodium hydroxide composition.

4. The apparatus of claim 1 wherein said main heating unit is comprised of a plurality of generally horizontal hollow metal tube members having one closed end extending within said container and an open end extending through the side wall of said container, said tube members containing electrical heating elements.

5. The apparatus of claim 4 wherein said heating elements are removable from the outside of said container.

6. The apparatus of claim 1 wherein the first and second vertical heaters are metal tubes having a closed bottom end and contain electrical heating elements.

7. The apparatus of claim 6 wherein the upper ends of said metal tubes are open and extended above the height of said bed of heat storage medium in liquid phase, whereby said heating elements are removable at a point above the level of said heat storage bed when said heat storage medium is in liquid phase.

8. The apparatus of claim 1 including a conduit in said container in heat exchange relation with said bed of heat storage medium for the passage of a heat transfer medium through said container.

* * * * *